J. M. W. KITCHEN.
ART OF UTILIZING GARBAGE.
APPLICATION FILED OCT. 11, 1912.
1,101,129.
Patented June 23, 1914.
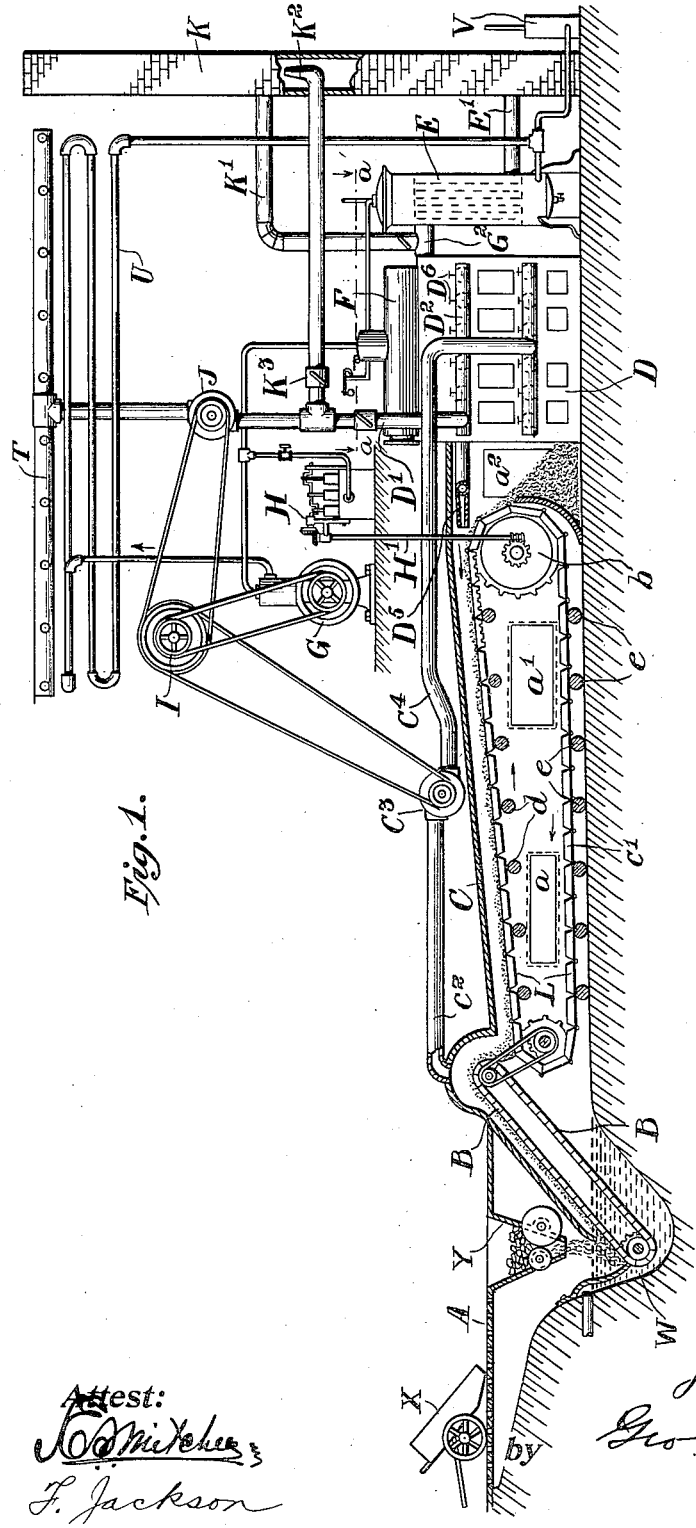
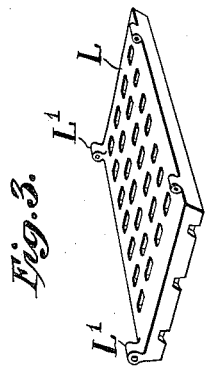
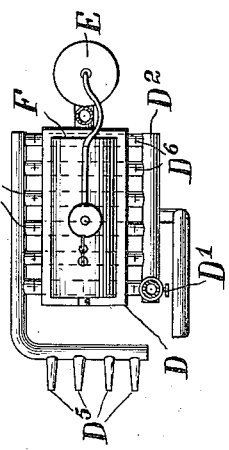

UNITED STATES PATENT OFFICE.

JOSEPH MOSES WARD KITCHEN, OF EAST ORANGE, NEW JERSEY.

ART OF UTILIZING GARBAGE.

1,101,129. Specification of Letters Patent. Patented June 23, 1914.

Original application filed March 1, 1910, Serial No. 546,585. Divided and this application filed October 11, 1912. Serial No. 725,199.

*To all whom it may concern:*

Be it known that I, JOSEPH MOSES WARD KITCHEN, a citizen of the United States, residing in the city of East Orange, county of Essex, State of New Jersey, have invented new and useful Improvements in the Art of Utilizing Garbage, of which the following is a specification.

The present application is for the purpose of claiming the method of treating garbage, and claiming the product produced by that method, as disclosed in my application for patent Serial No. 546,585, filed March 1st, 1910, (which has matured into Patent No. 1,063,886 granted June 3, 1913,) of which the present application is a division.

The referred to application shows and claims, apparatus for conveniently and economically carrying out the method herein after described.

One of the great aggregate wastes of towns and cities is the refuse food material, commonly known as garbage. This material is generally utilized as swine or poultry food at those places where such animals are kept, and without special treatment of the garbage, which is fed in a more or less active state of decomposition. The fact that such material is usually subjected to temperatures and moisture conditions which induce active fermentative changes in it, is a cause for the general regard of this material as being an annoying nuisance in towns and cities, which must be gotten rid of in the quickest and least objectionable manner. In some cases garbage has been treated with the purpose of abstracting fats from it and of making fertilizer from the residue thus treated. In other cases, the cremation of the material is proposed and practised, and the ashes from the cremated material is used for filling in purposes, notwithstanding the fact, that the ashes from the material is very rich in its contained potash and phosphoric acid.

Up to the time of the present invention, it is thought that the full economic food value of rightly treated garbage, has not been recognized; and the object of this invention is to so treat the garbage as to make of it a valuable food product for domestic animals that may be inoffensively transported.

The general idea of the invention is to separate from the garbage, unrelated matters such as tin cans, crockery and glass, to dry the garbage, sterilize and deodorize it, and to pulverize it to a sufficiently fine pulverulent flour-like state for its convenient handling and safe feeding to domestic animals.

In carrying out the method, it is very important that the process be conducted in such manner that the product made is produced at a very low cost, and without offense to residents in or around the utilization operating plant. In effecting these results, I apply in a measure various heat economizing and other methods which I also apply in a number of other inventions. For example:—I apply in the method, the valuable principle of a counter-travel in the transfer of heat, using high degrees of heat for accomplishing work of which high degrees of heat alone are capable of performing, and utilizing low degrees of heat for performing work which such low degrees of heat are capable of performing. I utilize helpfully the force of gravity in securing certain results. I use regeneratively, waste heat in cycle; and I utilize waste carbonaceous matters such as barrels, boxes, paper and cinders for generating the heat applied in the process. It is obvious that so simple a process as that which I use to accomplish my object, may be carried out, though with perhaps less efficiency, by other forms of apparatus, than that hereinafter described, and that their description is not needed in this application.

In carrying out the method in a preferred manner I proceed as follows:—The garbage is dumped on a perforated platform through which water that can be separated by dripping is eliminated from the garbage. The garbage is spread on this platform, which may be a traveling one if desired, and such extraneous matters as tin cans, crockery, bottles, broken glass and so forth, are separated from the garbage. In some instances it may be desirable to separate some of the moisture from the garbage centrifugally. The next step is that of a preliminary comminution of the garbage, including bones, that are in the material, to a somewhat uniform condition as to the size of its particles, so as to facilitate quick and uniform drying aeration and sterilization of the particles.

The comminuted material is then placed on a traveling conveyer and is exposed to the direct contact with a blast of hot air traveling in a line that is in counter direction to the travel of the garbage. The process applies the hottest air to the garbage that is most dried, and as the air loses heat, it becomes successively applied to garbage of lower temperatures, which is hence able to be heated by the heat in the air of lesser temperatures, or be influenced by that heat. The drying, deodorizing and sterilizing air is heated by forcing it through a series of metal pipes that pass through the furnace of the apparatus, which provision prevents admixture of the air with the gaseous products of combustion.

An important feature of my invention is my method of deodorizing the garbage. Previous inventions have neglected this point and presumably on that account largely, the residual food elements of treated garbage have been relegated to fertilizing uses only. In the present invention, I provide for a sufficient aeration of the garbage, while it is being dried, heated and sterilized to eliminate from the product offensive odors, and to a certain extent, objectionable flavors. I accomplish this result by heating the garbage with a current of pure air that while being heated is not admixed with gaseous products of combustion. I provide for regulating the amount of air needed to effect deodorization, as well as the application of sufficient heat to the garbage, through the air used in its deodorization; the air supply and the heating influence being under separate controls. It requires a large volume of air to effect the aeration and elimination of the garbage fumes of decomposition. This large volume of fume laden air is passed through the furnace of the processing plant, in which is generated sufficient steam to run the motor elements of the plant. The heat in any excess of steam that may be produced, is utilized through its radiation and transfer to new supplies of air to be used in the heating and aerating performance. In particular I draw attention to my procedures in this invention of regeneratively using heat in carrying out the method. This is important, inasmuch as great economy in securing the result is economically commercially desirable.

The air after it has performed its function of sterilizing, drying and deodorizing the garbage, is drawn and forced by an exhauster and blower to and into the furnace of the apparatus through suitable twyer pipes, both through and over the flames in the furnace. The drier apparatus is substantially air tight in its incasement; and the drying and sterilizing air which becomes impregnated with the obnoxious fumes of the drying garbage, is used as air for combustion in the operation of the furnace, in which the heat of the combustion process decomposes and deodorizes the fumes. The residual gases of combustion are discharged into the atmosphere at a high level above the apparatus used, thereby securing a sufficient air dilution of the gases and preventing their admixture with the air breathed by the human beings at a low level in or around the operating plant.

The building in which the apparatus would be installed is practically air tight at its highest levels, so that any fumes that may escape from the garbage along with air heated by radiant heat from hot surfaces of the plant, arising to a high level of the interior of the building is there intercepted and caught. From this high level, the heated air and fumes are drawn by a mechanically operated exhausting and forcing fan and forced through metal pipes heated by the furnace, and from thence over and in contact with the garbage; finally being expelled to the atmosphere after fulfilling the office of air for combustion in the furnace. The expulsion of the exhaust gases is conveniently assisted by an induced draft, mechanically produced, in the chimney stack of the apparatus. Effective provision is made for controlling the temperature of the drying and sterilizing air, and for passing it over the garbage at such a rate of speed as will secure the proper drying, aeration and sterilization of the garbage without destroying its food value. The degree of drying and heating of the garbage is controlled by the amount of air and its degrees of heat, that is passed over and in contact with the garbage and the rapidity of travel given to the conveyer of the apparatus.

When the garbage has been sufficiently dried and heated, it is all usually, while it is in a warm condition, ground to a very fine pulverulent condition so as to completely pulverize bones, glass, and crockery and metallic particles, that have been left in the garbage, and also to thoroughly admix the various bone, meat and vegetable constituents in the garbage.

The prepared garbage is a convenient and valuable food for poultry and swine, and may be used as a land fertilizer. It may be prepared in an inoffensive manner, and be shipped and delivered as prepared without offense. The method can be conducted in the midst of thickly populated districts without being a menace to health or annoyance to the public.

The final comminution and pulverization of the dried and sterilized garbage can be effected by any of the known means for grinding materials of this character, and which need no illustration here; but the other steps of the method, and the principles applied in my invention, are exemplified by the action of the structure diagrammatically shown in the accompanying drawings, in which:—

Figure 1 represents in elevation, and partly in section, a device which is especially designed to dry, sterilize and comminute garbage, and to prepare that material as a food for farm animals. Fig. 2 represents a plan view of part of the device, it being taken on the line $a$—$a$, Fig. 1. Fig. 3 represents on an enlarged scale a carrier plate comprised in the traveling conveyer used in the device illustrated in Fig. 1.

Various principal parts are represented by the following reference characters:—A is a perforated platform on which garbage is dumped. B is an elevating carrier. C is a drier. D is a furnace for burning paper and other combustible wastes. E is a water heater. F is a boiler. G is a steam engine. H is a multiple cylinder steam motor. I is a drive shaft with pulleys. J is an induction and forcing fan. K is a chimney stack. L is one of the plates of the traveling conveyer $c^1$. T is a hot air conduit. U is heat radiating piping. V is a pump. W is a fluid well and seal. X is a cart. Y is a grinder.

The elevator B and the conveyer $c^1$, are inclosed in a sheet metal incasement, having the ports $a$ and $a^1$, and the door $a^2$, all of which may be closely sealed. Through the door $a^2$ the dried refuse is removed and shipped for use, usually, and especially if the garbage is to be used for food, being first finely ground after drying. The conveyer $c^1$ is composed of a number of conveyer plates L, which are joined together by the lugs $L^1$ and suitable bolts. On the bottom of the plates L are recesses which receive the cogs of the drive wheel $d$. The conveyer web is supported at the top by the rollers $d$, and at the bottom by the rollers $e$. These rollers have the ends of their shafts supported by the side plates of the metallic incasement of the drier apparatus. The roofing of the incasement of the conveying device is highest at the end nearest the furnace. This construction retains the hottest gases in that part through the action of gravity on those gases, and the conveyer which travels in a plane sloping upward toward the furnace, conveys the material to be dried up into the zone containing the gases of highest heat. The floor under the conveyer slopes toward the well W, draining thereinto any drip from the material on the conveyer.

In operating the device, the garbage is dumped from the cart X on the perforated platform A. The liquid from the garbage is drained through the platform, and runs into the well W, the water seal of which prevents fumes from being blown from the incasement of the drier that emanates from the material. The fumes are forced through the inlet of the conduit $c^2$ by the blast from the twyers $D^5$. The garbage is spread out on the platform, and tin cans, glassware and other matters extraneous to the garbage, are separated from it. The garbage is then fed into the grinder Y, which crushes the bones and otherwise comminutes the garbage to particles of a size which secures a quick and uniform drying of the garbage, which, falling upon the elevator B is carried upward and is precipitated onto the carrier $c^1$. This carrier is given a definite speed of travel in the direction indicated by an arrow, by means of the motor H, operating through the bevel and worm gear $H^1$. It is through regulated coöperation of the motor H, the fan J and the furnace D that the needed volume of air to secure deodorization and proper heating of the garbage is effected. In this process not only is fermentative action stopped, but also, the odors of that decomposition are removed from the garbage. As the garbage is carried toward the furnace D, it meets a blast of hot air, which is drawn from a high level in the building housing the plant, through the air conduit T by the induction and forcing fan J which forces the air successively through the conduit $D^1$, the header $D^2$, the heating pipes $D^3$ and the twyers $D^5$. The heating pipes $D^3$ are of cast iron, and are built in the masonry work of the furnace D. The dampers $D^6$ regulate the amount of air passing through either one of these heater pipes. The pipes are heated by the burning of wooden boxes, barrels, paper, or other combustible matter, in the furnace D, and the heat of the air blast emerging from the twyers $D^5$ is controlled by the volume of air allowed to pass through the damper controlled conduit $D^1$. The hot air is blown through the drier part of the device in counter-current to the travel of the garbage, which is consequently progressively heated, dried, aerated, deodorized and sterilized. The formation of the upper incasement of the device C provides through the upwardly buoyant effect of gravity for the maintenance of a stratum of the hottest gases at a high level in the drier. As these gases cool they are drawn out by the action of the fan $C^3$ through the conduit $c^2$, and forced through the conduit $C^4$, to the air for combustion feeding device of the furnace D. The gases carrying moisture and fumes from the drying garbage, are forced through the burning fuel in the furnace D, thus decomposing and deodorizing organic matter in the gases. The furnace D has a plurality of fuel feeding compartments, one or more of which may be operated independently of the others. The gases pass out of the furnace D through the gas exit $G^2$, into the upper part of the water heater E, and are drawn downwardly through the water heater E, out through the gas exit E¹, and are exhausted through the stack K. When it is desired to have a direct draft for the gases from the furnace into the stack K, the gases are allowed to pass through the damper controlled conduit K¹. The draft in the stack K can be increased by the injection of air forced by the fan J through the injection device K², controlled by the damper K³. Feed water and water of condensation are fed into the water heater E, by the pump V, and by gravitating from the radiating pipe U. The water, as it is progressively heated in its upward passage through the device E, is pumped over into the boiler F, and becomes therein converted into steam which is used to operate the steam engine G and the motor H.

In the construction of the drier, in order to prevent emission of fumes, provision is made to prevent the passage of gases through the walls of the drier, except through the special conduits for heated air, and at the exit for the fume laden air. The door $a^2$ is arranged for a tight closure, and the water seal in the pit W prevents entrance of air or emission of fumes therethrough. The speed of the blower C³ is maintained at a rate to maintain an induced draft continually in the drier. The installation is housed in a building not shown in the drawing in which any fumes arising from the garbage are caught at a high level in the building, and drawn downwardly, and finally used as air for combustion; the fumes being decomposed and deodorized by the heat of the furnace. The protective building housing such a plant may be of any suitable type. A number of details which would necessarily be included in plants of this kind are not indicated in the drawings.

The general ideas underlying the purpose of the invention herein described, are to economize heat and otherwise handle garbage in such a manner that that material may be conveniently, inoffensively and economically treated.

It will be observed that the principle as here applied in the heating and sterilizing processes in the plant, of providing work for heat of low degrees to accomplish of which such heat is capable, and of reserving heat of high intensity for doing work of which that heat alone is capable of performing, is also adopted in heating air for use in the plant; the air being heated progressively, first with low degrees of heat, and finally with the higher degrees of heat. The provision shown for conveying the exhaust steam from the engine G to a high level of the radiating pipe U, and then gradually bringing the condensing steam in a downward travel to a lower zone, indicates the principle adopted of progressively heating the air for the uses of combustion or heating, as the air progressively rises.

There are many kinds of driers in existence, and it is common to dry and pulverize a large variety of substances; but so far as the applicant knows, no one prior to applicant had proposed applying this common process in treating the mixtures of vegetable and animal constituents, largely diluted with liquids, composing the usual household food waste known as garbage, as a practical economic method of solving the problem of towns and cities as to the best disposition of such wastes. The origination conceptively of such a plan, is invention; and the product produced, is a new one of value, being substantially of a nutritively balanced character as to its food constituents, chemically and physically; and being safe to use for the purposes of feeding animals, after its reduction to a very fine condition of pulverulency and a thorough admixing of the constituent ingredients of the garbage by a special method of grinding, after its sufficient drying and sterilization, to a physical condition which is essentially different from that of a product produced by grinding or pulverization to a mere granular condition.

What I claim as new is:

1. The method of treating garbage herein described, which consists in, comminuting, drying, aerating, deodorizing and sterilizing garbage in which all the food constituents of the garbage are retained, and finally reducing the garbage to a finely pulverulent condition.

2. The method of treating garbage herein described, which consists in, separating extraneous materials from the garbage, reducing the garbage to particles of relatively uniform and small size, removing watery fluid from the garbage, spreading the garbage in a thin layer on a traveling conveyer, bringing the spread garbage in progressive direct contact with a current of drying and heating gas of progressively increasing temperature, whereby the garbage is dried and sterilized, and comminuting the dried and sterilized garbage.

3. The method of treating garbage herein described, which consists in, comminuting the garbage, drying, aerating, deodorizing and sterilizing the garbage through the use of a mechanically forced heated blast of air, and using the air and fumes emanating from the garbage in the contact of the air with the garbage for supporting the combustion of fuel used in heating the mechanically forced blast of air, whereby the fumes from the garbage are decomposed, deodorized, support combustion and the heat of the mechanically forced blast is used regeneratively.

4. The method of treating garbage herein described, which consists in, drying and sterilizing garbage by the contact of a moving counter current of hot air, preheating the air used in drying and sterilizing the garbage by burning fuel through the aid of the waste heat of air heated by low temperature heat generated for but not used in the step of drying and sterilizing the garbage, and more highly heating the preheated air to a sterilizing temperature, whereby some of the heat energy used in the process of drying the garbage is used regeneratively in cycle in carrying out the method.

5. The method of treating garbage herein described, which consists in, conveying the garbage to a place for its treating, maintaining an open zone accessible for gases rising into such zone in the parts above said place of treating the garbage, whereby fumes from the garbage may rise into said open zone, preheating the air rising into said open zone with heat radiated from apparatus used in treating the garbage, exhausting the heated air from said open zone and forcing the air for use in drying, aerating and sterilizing the garbage and in the combustion of fuel, more highly heating the air with the heat of said combustion, blowing the highly heated air into contact with the garbage while the garbage is being conveyed in a travel that is in counter-direction to the travel of the air that has been blown, preventing escape of malodorous fumes from the garbage while being treated, deodorizing the fumes and delivering at a high level in the atmosphere above the place where the garbage is treated the gaseous products of the combustion and deodorizing process used in the treatment of the garbage.

6. The method of treating garbage herein described, which consists in, sorting extraneous matters from the garbage, removing dripping moisture from the garbage, comminuting the garbage, conveying the garbage to a drier, conveying the garbage through the drier in contact with a counter current travel of heated substantially pure air and at a rate of speed securing the drying, deodorization and sterilization of the garbage while in the drier, and removing the garbage from the drier in an unburned condition.

JOSEPH MOSES WARD KITCHEN.

Witnesses:
 Geo. L. Wheelock,
 F. Jackson.